United States Patent [19]
Lutz

[11] Patent Number: 5,597,486
[45] Date of Patent: Jan. 28, 1997

[54] MEMBRANE FILTRATION WITH OPTIMIZED ADDITION OF SECOND LIQUID TO MAXIMIZE FLUX

[75] Inventor: Herb Lutz, Belmont, Mass.

[73] Assignee: Millipore Investment Holdings Limited, Wilmington, Del.

[21] Appl. No.: 431,562

[22] Filed: May 1, 1995

[51] Int. Cl.$^6$ .................... B01D 11/04; B01D 61/22
[52] U.S. Cl. ................. 210/639; 210/96.2; 210/644; 210/650; 210/805
[58] Field of Search ................ 210/96.2, 143, 210/195.2, 321.65, 637, 639, 650, 651, 739, 644, 649, 652, 805; 364/497, 500, 502

[56] References Cited

U.S. PATENT DOCUMENTS

| | | | |
|---|---|---|---|
| 3,462,362 | 8/1969 | Kollsman | 210/639 |
| 4,222,870 | 9/1980 | Sternberg et al. | 210/650 |
| 4,728,430 | 3/1988 | DiLeo et al. | 210/651 |
| 4,789,482 | 12/1988 | DiLeo et al. | 210/651 |
| 4,968,429 | 11/1990 | Yen | 210/644 |

FOREIGN PATENT DOCUMENTS

| | | | |
|---|---|---|---|
| 464321 | 1/1992 | European Pat. Off. | 210/96.2 |

OTHER PUBLICATIONS

Blatt et al. "Membrane Ultrafiltration: The Diafiltration Technique and its Application to Microsolute Exchange and Binding Phenomena" Analytical Biochemistry 26, 151–173 (1968).

Ng, et al. "Optimization of Solute Separation by Diafiltration Separation Science", 11(5), pp. 499–502, 1976.

Beaton, N. C. et al. "Industrial Ultrafiltration Design and Application of Diafiltration Processes" J/Separ. Proc. Technol., 4(2) 1–10 (1983).

Jaffrin, J. P. et al., "Optimisation of Albumin Production by Ultrafiltration" Recents ProgresGenie Procedes, 6 (1992) 299.

Jaffrin, J.Ph. "Optimization of ultrafiltation and diafiltration processes for albumin production" Journal of Membrane Science 97(1994) 71–81.

Dutre, B. et al. "Macrosolute–microsolute separation by ultrafiltration: A review of diafiltration processes and applications" Desalination, 95 (1994) 227–267.

Rajagopalan, N. et al. "Process Optimization in Ultrafiltration: Flux–time considerations in the purification of macromolecules" Eng. Comm. 1991 vo. 106 pp. 57–69.

*Primary Examiner*—Joseph W. Drodge
*Attorney, Agent, or Firm*—Andrew T. Karnakis

[57] ABSTRACT

A membrane-based tangential flow filtration system is disclosed which includes optimized performance capabilities by taking into account the variety of flux and component passage behavior occurring during filtration processing. The system maximizes the recovery of a desired component in the permeate from a sample solution containing two or more components, in minimum time and with minimum filtration area, by optimizing the mass flux of the desired component by continuously controlling the rate of addition of a diafiltrate solution to the system to maintain the optimum balance of component concentrations.

20 Claims, 14 Drawing Sheets

Whey/Lactose Diafiltration

Radiopaque Diafiltration

Wine Diafiltrate Flow

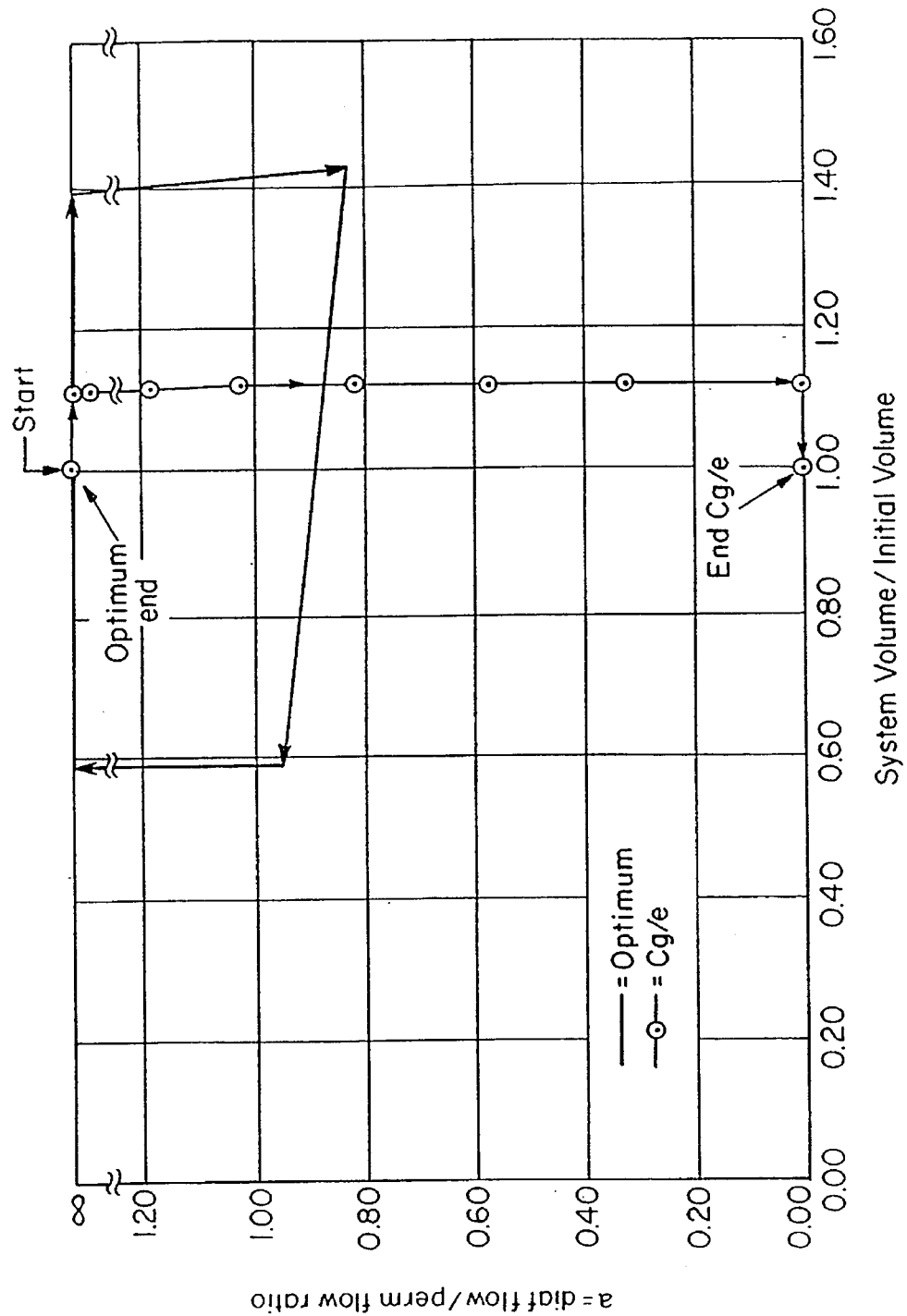

5,597,486

MEMBRANE FILTRATION WITH OPTIMIZED ADDITION OF SECOND LIQUID TO MAXIMIZE FLUX

BACKGROUND OF THE INVENTION

The present invention relates to membrane-based filtration systems and more particularly to techniques for optimizing the operation of such systems to maximize recovery of a desired component in minimum time.

Filtration systems commonly used in industrial applications today include tangential flow filtration (TFF) systems which use membranes to separate components in a liquid sample solution on the basis of their effective size differences. The sample solution housed in a tank or other suitable reservoir flows across the face of the membrane at an elevated pressure which drives permeable components smaller than the pore size of the membrane through the membrane as permeate while retaining larger components in a retentate stream. The retentate stream is recirculated to the tank and ultimately pumped across the membrane in a continuous fashion. Notwithstanding the sweeping flow action of TFF systems, certain component species within the sample solution typically remain trapped on the surface of the membrane and form a concentration polarization gradient which affects the permeability of those components passing through the membrane.

Depending on the mode of operation of the TFF system, the volume of the sample solution can be significantly reduced as permeate is withdrawn from the system as the sample solution becomes concentrated (i.e. concentration mode). On the other hand, many applications involving the separation of two or more components add a diafiltrate solution at the same rate as permeate is withdrawn to maintain the overall system volume constant while removing the permeable component from the sample solution (i.e. constant volume diafiltration mode). Control strategies also can involve combinations of concentration and diafiltration modes of operation. These strategies involve control of both the diafiltrate flow ($q_d$) and the permeate flow ($q_p$). There have been numerous attempts published in the literature to try to optimize processing conditions by controlling certain parameters of the TFF system.

As described by Blatt et al., *Anal. Biochem.*, 26 (1968) 151, discontinuous batch diafiltration involves varying the diafiltrate flow rate from a pure concentration mode ($q_d=0$) to a pure dilution mode ($q_p=0$) in a step wise manner. This process is repeated as a series of n sequential concentrations (from volume $V_O$ to volume V) and dilutions where system concentrations decline from an initial value $c_O$ to a value $c=c_0 (V_0/V)^{-\sigma n}$ for component passage $\sigma$. However, as subsequently recognized (see Ch. 3 in Mears, "Membrane Separation Processes", 1976) the discontinuous diafiltration method produces lower average fluxes due to the higher average system concentrations of the polarizing species over the diafiltration process. This will require long processing times or large system membrane areas to reach the target purity. Additionally, discontinuous diafiltration is cumbersome to implement in a production scale system.

As described in the same publication as above, Blatt et al. also refer to constant volume batch diafiltration which involves keeping the diafiltrate flow rate equal to the permeate flow rate over the entire process. This maintains a constant system fluid volume $V_O$ during the process while component concentrations in the system decline from an initial value of $c_0$ to a value $c=c_0 e^{-\sigma V_d/V_o}$ for component passage $\sigma$ and diafiltrate volume $V_d$. While high fluxes can be maintained using this technique, the large amount of diafiltrate required can result in long process times or large membrane areas, both of which lead to uneconomical results.

A modification of constant volume batch diafiltration was described by Ng et al., Sep. Sci., 11, (1976) 499. In this scheme, initial experimental data is generated to produce a plot of flux versus concentration of the polarizing species. The optimum diafiltration point ($c_g/e$) is determined by first extrapolating the generated data points to find the zero flux intercept or gel point ($c_g$) and then dividing by 2.718 (the value of e). After $c_g/e$ is determined, implementation of the control strategy occurs in two steps, first by conducting either a pure concentration mode ($q_d=0$) step or pure dilution mode ($q_p=0$) step to bring the concentration of the polarizing species from its initial value $c_o$ to $c_g/e$. The next step is to run the system under constant volume diafiltration conditions at this empirically obtained optimized polarizing species concentration point until the desired retentate concentration of the passing species is obtained.

The existence of an optimum diafiltration concentration according to the teachings of Ng et al. arises from a tradeoff between the decreasing volume of permeate produced as one concentrates the initial batch, and the decreasing flux produced as the concentration of retained components are increased. The N get al. strategy is economically optimal when the diafiltration step process time dominates the total process time, the polarizing species is completely retained, the passage of the permeating species is constant, and the flux (J) variation with the concentration of the polarizing species (c) is described by the film model as $J=k \ln (c_g/c)$. In this model, $c_g$ is the gel point and k represents the mass transfer coefficient. The foregoing conditions are not always met over the wide range of variables typical of most TFF applications.

Beaton and Klinkowski, *J. Sep. Proc. Techn.*, 4 (1983) 1, use the same strategy as Ng et al. but account for deviations in flux (J) from the film model. They identify the optimum batch concentration of the polarizing species (c) at which to diafilter as that value of (c) which produces a minimum in the plot of 1/Jc vs c. While this publication recognizes in some cases that flux varies with both the retained species concentration and the permeating species concentration, the authors suggest using the Ng et al. diafiltration strategy with a flux versus polarizing species relationship, J(c), which is determined at low permeating species concentrations. Hence this technique ignores the flux dependence on the permeating species and thus will not produce optimum results when the flux varies over the course of the diafiltration.

Jaffrin et al., Récents Progrès Génie Procédés, 6 (1992) 299, considered the effect of both retained species concentration and permeating species concentration on flux by adding another step to the Ng et al. strategy for an application involving the removal of ethanol from albumin. The feed is first diluted with water to reduce ethanol concentration, then concentrated to increase the albumin concentration. After these steps, a constant volume diafiltration was run to reduce ethanol concentration to a final specification. The Jaffrin et al. step-wise process is a discontinuous approximation of actual conditions and thus does not accurately reflect optimal system operations. This publication also hints at a possible different strategy involving diafiltration under diminishing volume. However, no analysis or data is shown as to how one might implement this approach. More recently, Jaffrin et al., *J. Mem. Sci.* 97 (1994) 71, elaborate on the above strategy by describing operation at a constant diafiltrate to permeate flow ratio over the entire process. The "trial and error" optimization strategy used to identify the best value for this ratio provides little guidance as to when this approach has utility. In addition by requiring a fixed ratio over the entire process, this strategy does not account for the effect of changing concentrations of the species.

DiLeo et al., U.S. Pat. No. 4,728,430, described the first significant departure from the Ng et al. strategy by proposing a new diafiltration processing technique based on maintaining a constant system concentration of a particular polarizing species instead of maintaining a constant volume. This strategy allows for the case where the polarizing species is only partially retained by specifying a diafiltrate addition flow where the system volume decreases over the course of processing. While this strategy is described in the context of blood plasma separation, it is generally applicable to all separations using TFF where only one particular component controls the flux and passage over the course of processing.

All of the foregoing attempts have failed to adequately take into account when more than one species in the sample to be filtered controls the flux and passage of the permeating species during diafiltration and thus are deficient in the processing goal of maximizing recovery of the desired component in the minimum amount of time.

SUMMARY OF INVENTION

The present invention overcomes the limitations of the prior art by providing a process for optimizing the performance of a membrane-based filtration system which takes into account the variety of flux and component passage behavior occurring in practice to obtain maximum recovery of a desired component in the permeate from a sample solution containing two or more components in minimum time with minimum filtration area. The invention provides for optimizing the mass flux of the desired component to be recovered in the permeate by continuously controlling the rate of addition of a second liquid to the system to effect control over one polarizing species from the sample solution to be separated and to maintain the optimum balance of component concentrations in the system. The rate of addition of the second liquid is continuously adjusted during a filtration run in response to changes in the polarizing species from one species which may dominate the flux and passage at a given point in the filtration run to another species at a different point in time to maintain this optimum balance. This strategy is generally applicable to a variety of microfiltration, ultrafiltration, and reverse osmosis filtration systems where fluxes or passages vary with the concentrations of retained and permeable species.

In accordance with a preferred embodiment, a TFF system is operated in a diafiltration mode and the sample to be separated includes two or more components. The optimal balance of component concentrations in the system is achieved by continuously varying the diafiltrate flow rate. Differential solvent and solute mass balances of the components in the system, which illustrate how the variables in the system evolve over time, can be described by a series of first order differential equations written in terms of a scaled time variable z=At, which is equal to the product of the filtration area and the time, to effect the separation (recovery) of the desired component, as follows:

$$\frac{dV}{dz} = J(a-1), \quad \frac{dM_i}{dz} = -J_i,$$

-continued $$\frac{d\ln c_i}{dz} = -\frac{J}{V}(\sigma_i + a - 1)$$

where, V=system volume (L)

J=solvent flux (L/m²-hr)

$M_i$=retained component masses (g)

$J_i$=component solute mass flux (g/m²-hr)

a=variable diafiltrate to permeate flow rate ratio $c_i$=concentration of solute component "i" in system (g/L)

$\sigma_i$=passage of component "i"

Solution of these equations which determine the time evolution of concentrations in the system requires a flux model J ($c_i$), a passage model $\sigma_i(c_i)$, and a prescribed diafiltration strategy which can be represented by a function of the diafiltrate flow ($q_d$) to permeate flow ($q_p$) ratio, namely a(z)=$q_d/q_p$. This formulation allows for an arbitrary diafiltrate flow rate a(z) which can change over time z where:

a=0 corresponds to a pure concentration mode

0<a<1 corresponds to partial concentration/partial diafiltration a=1 corresponds to a constant volume (conventional) diafiltration mode a>1 corresponds to partial diafiltration/partial dilution a→∞ corresponds to a pure dilution mode.

The optimum control strategy of the present invention is predicated on the discovery that maximizing the mass flux of a component to be recovered (component A) in the permeate ($J_A$ or $\ln J_A$) from a multi-component sample serves to define the manner in which the diafiltration flow rate must be continuously adjusted to maintain operation of the TFF system along the optimum diafiltration path. For passage and flux models defined by $\sigma_i(c_i)$ and J($c_i$), the component concentrations which provide this optimization goal are defined by the following expression:

$$g(c_i) = \left[ 1 + \Sigma_i \frac{\partial \ln J}{\partial \ln c_i} + \Sigma_i \frac{\partial \ln \sigma_A}{\partial \ln c_i} \right] = 0$$

where, g($c_i$) represents the implicit relation among the concentrations of the various components (i=A,B,C, ... ) in the sample along the optimum diafiltration path.

The process control strategy that has been derived according to the present invention to achieve this optimal balance of component concentrations and to maintain such balances over the course of processing involves the following:

1) Moving from an initial concentration point {$c_{io}$} to the optimum surface g($c_i$) using a pure concentration (a=0) or pure dilution (a=∞) strategy, as needed;

2) Moving along the optimum surface by adjusting diafiltration flow using:

$$a(c_i)=1-\{\Sigma_i\sigma_i[\partial g/\partial \ln c_i]\}/\{\Sigma_i[\partial g/\partial \ln c_i]\}$$

3) Moving from the optimum surface to the final desired target point {$c_{if}$} using a pure concentration (a=0) or pure dilution (a=∞) strategy, as needed.

These and other aspects of the present invention will become apparent from the following detailed description taken in conjunction with the drawings.

DESCRIPTION OF THE DRAWINGS

FIG. 14 is a graph comparing the results obtained for the separation of Example 4 as a function of varying the system volume over the time course of filtration processing.

DETAILED DESCRIPTION OF PREFERRED EMBODIMENTS

Figure 1:
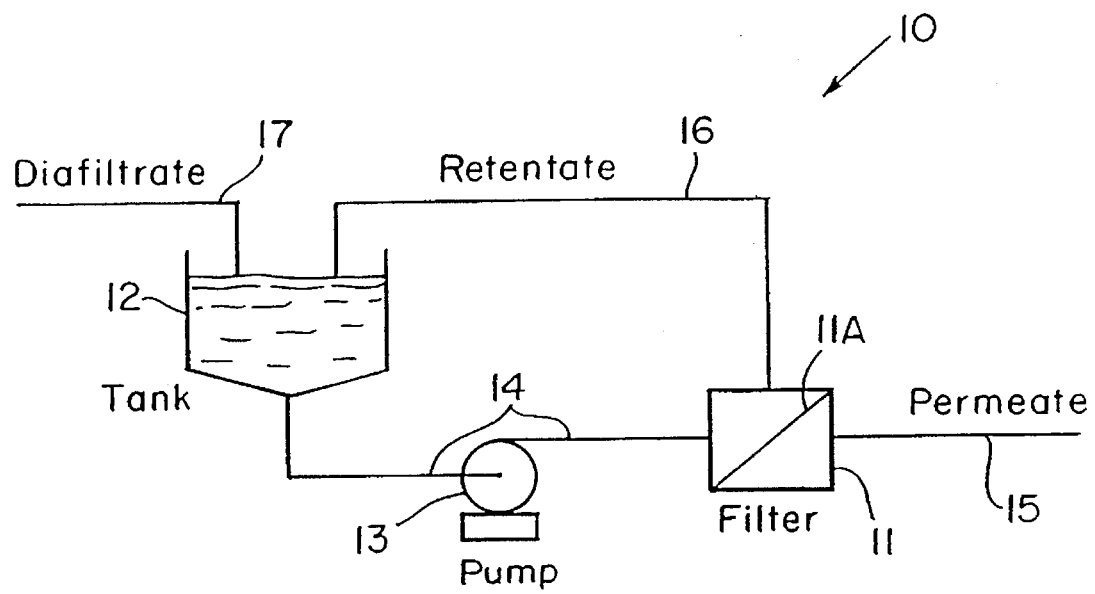
FIG. 1 is a schematic block diagram of a tangential flow filtration system constructed and operated in accordance with a preferred embodiment of the present invention.

FIG. 1 is a schematic representation of a tangential flow filtration (TFF) system 10 which includes a filtration module 11 housing a filtration membrane 11A. The membrane is selected based on the size of the components to be separated and can be generally either one of three types, a microfiltration membrane (retaining components between 0.05 and 10.0 microns), an ultrafiltration membrane (retaining components between 0.005 and 0.05 microns) or a reverse osmosis membrane (retaining components between 50 and 500 Daltons). Such membranes are constructed from any number of materials including polyvinylidene fluoride, polysulfone, polyethersulfone, polyamides, and mixed esters of cellulose. Moreover, the membranes may also be constructed from non-polymeric materials such as ceramic or metallic materials. The type and material used for the membrane to be selected depends primarily on the application and is well known to those of ordinary skill in the art.

The TFF system 10 also includes a tank 12 for housing the sample solution to be separated and a pump 13 connected between the tank and the filtration module 11 by a feed conduit 14. A permeate conduit 15 removes permeate solution which passes through the membrane 11A and a retentate conduit 16 recirculates retentate solution which does not pass through the membrane to the tank. To complete the system, a diafiltrate conduit 17 is connected to the tank to allow for the addition of diafiltrate solution to the system during the course of processing. It will be appreciated that for sake of simplicity certain minor components, such as valves, pressure regulators, sensors, heat exchangers, etc., have been omitted from the system although the location and operation of such components is well understood by the skilled artisan.

In operation, the membrane 11A separates components in the sample solution on the basis of their effective size differences. In accordance with an important aspect of the present invention, the sample solution includes at least two species or components which are to be separated from one another. The sample solution housed in the tank 12 flows across the face of the membrane at an elevated pressure which drives permeable components smaller than the pore size of the membrane through the membrane as permeate while retaining larger components in the retentate stream. The retentate stream is recirculated to the tank by the conduit 16 and ultimately re-pumped across the membrane in a continuous fashion. Notwithstanding the sweeping flow action of TFF systems, certain component species within the sample solution typically remain trapped on the surface of the membrane and form a concentration polarization gradient which affects the permeability of those components passing through the membrane.

As used in this description and in the claims, the terms "concentration polarization" or "polarizing species" are used interchangeably and are meant to describe any phenomenon which influences mass flux. Thus these terms are intended to include ultrafiltration concentration polarization occurring during protein fractionation by molecular osmosis, viscosity influences arising from the solvents being processed, or cake formation on the membrane surface attributed to particles within the sample solution as well as similar phenomena.

Additionally, the context of the description is in terms of conventional tangential flow filtration; however, the present invention has broad applicability to any filtration process. This includes systems where no retentate stream exists, the membrane is integral with the tank, and tangential flow is provided by a rotating blade as in a stirred cell or spinning disk filter. Also encompassed by the invention are systems with a cartridge filter where no tangential flow is present and the addition of a diafiltrate could occur by use of an inline tee where feed and diafiltrate are mixed and then delivered to the cartridge filter.

The objective of the process to be described hereinafter is to attain the desired degree of separation between two or more components in a sample (e.g. a system fluid purity specification) in the most optimal (economical) manner which takes into account the variety of flux and component passage behavior which occurs during processing. The process strategy according to the present invention rests on maximizing the mass flux of the component of interest (A) in the permeate ($J_A$ or $\ln J_A$) at each point in time with respect to the diafiltration rate a.

When defining an optimal diafiltration strategy which involves maximizing the mass flux of a component (A) to be recovered in the permeate ($J_A$ or $\ln_{JA}$) at each point in time with respect to the diafiltration rate a, the concentrations which achieve this goal are defined by the following expression for passage and flux models defined by $\sigma_A(c_i)$, and $J(c_i)$:

$$g(c_i) = \left[ 1 + \Sigma_i \frac{\partial \ln J}{\partial \ln c_i} + \Sigma_i \frac{\partial \ln \sigma_A}{\partial \ln c_i} \right] = 0 \quad \text{(Equation 1)}$$

where, $g(c_i)$ represents the implicit relation among the concentrations of the various components (i=A, B, C . . . ) along the optimum diafiltration path.

When the solvent flux or component A passage depend on both the permeable component A and another retained component B, this implicit relation defines a curve of $c_A$ vs $c_B$ in two dimensions. The optimal diafiltration strategy will move along this curve over time. For a component mixture of three or more species, the optimal strategy will move along a multi-dimensional concentration surface, $g(c_1, c_2, c_3, \ldots)=0$, over time.

The process control strategy that has been derived according to the present invention to achieve this optimal balance of component concentrations and to maintain such balances over the course of processing involves the following:

1) Moving from an initial concentration point $\{c_{io}\}$ to the optimum surface $g(c_i)$ using a pure concentration (a=0) or pure dilution (a=∞) strategy, as needed;

2) Moving along the optimum surface by adjusting diafiltration flow using:

$$a(c_i) = 1 - \{\Sigma_i \sigma[_i \partial g/\partial \ln c_i]\}/\{\Sigma_i [\partial g/\partial \ln c_i]\} \quad \text{(Equation 2)}$$

3) Moving from the optimum surface to the final desired target point $\{c_{if}\}$ using a pure concentration (a=0) or pure dilution (a=∞) strategy, as needed.

Processing Objective;

The separation goal in this case is to remove some amount of a permeable component A from the mixed feed solution (A and B) in the shortest possible time (or equivalently, using minimum membrane area). Maximizing the recovery of component A, $r_A = (M_{Ao-MA})/M_{Ao}$, where $M_{AO}$ is the initial mass of A in the sample and $M_A$ is the desired mass of A to be recovered, during a fixed time $z^*$ is obtained by maximizing $J_A$ at each point of time during the run. Note that this solution (maximizing $J_A$ at each point) to the problem of maximizing the recovery $r_A$ within a fixed time $z^*$ is equivalent to the dual problem of minimizing z to achieve a target recovery $r_A^*$.

The maximization of $J_A$ at each point of time during the process is achieved by manipulating all process control variables. For diafiltration, this specifically involves manipulating the diafiltrate flow rate. However, all other control variables including crossflow, transmembrane pressure, temperature, diafiltrate chemical composition, initial system composition, etc., should also be set at values which maximize mass flux at each point in the filtration run.

The implementation of the forgoing processing objective can take a variety of forms, all of which will be well understood by those of skill in the art. However, for sake of completeness details of one preferred implementation procedure are set forth below.

IMPLEMENTATION PROCEDURE a) Process Definition:

Define the initial concentrations, the final concentrations or separation objective and the process operating conditions. The separation objective defines which component is to be removed in the permeate and which component is to be retained. These operating conditions include temperature, diafiltrate composition, and hydraulic conditions of flows and pressures at which the TFF system is operated. In addition, the membrane type, the module type and the series/parallel flow configuration needs to be specified and the flow scheme (i.e. as batch, fed-batch or feed-and-bleed configurations) should also be defined.

b) Obtain Flux and Passage Data at a Variety of Feed Concentrations:

$[J_k(C_{ik}), \sigma_{ik}(C_{ik})$ over a series of points k and components i]

Take the feedstock solution and perform a sequence of concentration, dilution, and constant volume diafiltration runs while measuring flux and the concentrations of components in both the feed tank and permeate stream during the process. This procedure generates a table of flux and component passage values versus different feed tank concentrations.

c) Generate Flux and Passage Models: $[J(c_i), \sigma_i(c_i)]$

A variety of mathematical forms are available to describe the variation of flux and passage with component concentrations. These include both theoretically based gel and osmotic models, empirically based polynomial or inverse polynomial expressions, or neural net models. These models are then fit to the data using statistical regression methods or neural net learning methods to find the best fit values of the parameters in the model. The mathematical form of the model is not critical in prescribing the optimal diafiltration strategy as long as the concentration dependence of the flux and passages are accurately described over the range of concentrations of interest.

d) Generate the Optimal Concentration Surface: $[g(c_i)=0]$

The mathematical models for flux and passages are substituted into Equation 1 and the indicated partial derivatives are taken with respect to the concentration of each species while holding the concentration of all other species constant. The resultant expression defines a maximum mass flux concentration surface.

e) Generate the Optimal Diafiltration Strategy: $[a(c_i)]$

The diafiltrate addition rate needed to move along the optimum concentration surface is obtained by substitution of the optimal concentration surface expression and passage models into Equation 2 and taking the appropriate partial derivatives. The optimal strategy is then defined as first, an initial dilution or concentration step, as required, to move from the initial concentration point to the optimal surface. Second, movement along the optimal surface using the results of Equation 2. Third, a final dilution or concentration step to move off the optimal surface to the desired final concentration.

f) Design an Implementation Strategy

The diafiltration strategy can be implemented in a variety of ways. The optimal diafiltrate flow rate, defined by $a(c_i)$, can be substituted into the series of first order differential equations which describe how the system volume and concentrations evolve over time. These equations can then be numerically solved using standard methods (Euler, Runge-Kutta, Bulirsch-Stoer, etc.) to determine the numerical values of system volume and concentration over time, $V(z)$ and $c_i(z)$. These will define how the optimal diafiltrate flow rate varies over time as $a(z)$. This prescribed variation in flow over time can then be implemented automatically by means of an appropriately programmed microprocessor, or manually by an operator, to change flows by controlling pumping rates.

A feedback control loop in conjunction with the microprocessor could be set up to control the diafiltrate flow based on some deviation of a measured variable from its set point. This measured variable could include one of the following: the concentration of components in the system feed tank or in the permeate, the permeate flow or flux, or the mass flux in the permeate. The set point values are determined by the feed concentrations along the optimal surface (as defined by $g(c_i)=0$). These concentrations, coupled with the flux and passage models, $J(c_i)$ and $\sigma_i(c_i)$, can be used to define permeate concentration, flux, or mass flux set points.

Similarly, the control of the diafiltrate flow can also be implemented as a series of finite steps of sequential dilution and concentration ($a \to \infty$ followed by $a=0$) which, on average, approximate the optimum continuous solution.

The need for precise optimization can often be sacrificed for other reasons while retaining the majority of the economic and practical benefits as described throughout this specification. Thus whenever the terms "optimal", "optimizing" and the like are used herein with respect to the control of diafiltrate flow, it is to be understood that the same is intended to cover flow rates (average or continuous) which keep the concentration of system components within ±20% of the optimal strategy.

The principles and applicability of the present invention will be further illustrated in the following examples.

EXAMPLE 1) Protein/PEG Separation a) Process Definition

An ultrafiltration membrane was used to retain a high molecular weight protein while allowing polethylene glycol (PEG) of molecular weight 3.5K Daltons to pass through. The feed solution contained 5 g/dL PEG and 1 g/dL protein. The product concentrations desired were 0.5 g/dL PEG and 10 g/dL protein. The process fluid temperature was 20°–25° C., and the feed, retentate, and permeate pressures were maintained at 70 psig, 25 psig, and 0 psig respectively. A Millipore Biomax™-50 ultrafiltration cassette was used to retain the protein and pass the PEG.

b) Flux and Passage Dam

A test stand, configured as shown in FIG. 1, containing a 0.5 sqm Biomax™-50 ultrafiltration cassette available from Millipore Corporation, was flushed with USP grade WFI. After ensuring that water permeability and air integrity met the manufacturer's test specifications, the cassette was conditioned with a salt buffer solution. After draining the buffer, the tank was charged with 10 L of the feed solution A sequence of four, 23 to 38% volume reduction concentration operations (1.3 to 1.6 fold) and four, three-fold constant volume diafiltration operations were performed using a salt diafiltration buffer. This sequence allowed for the measurement of flux and passages of the protein and PEG over a range of feed solution concentrations. PEG and protein content assays were run on samples from the feed tank taken after each step in this process and showed that protein content did not appreciably decline during the run and that PEG passages averaged around 10% with no apparent change with increasing protein or PEG concentrations.

Fluxes decreased during the concentration steps and increased during the diafiltration steps. The increased protein concentration occurring during the concentration steps was responsible for lowering these fluxes through a polarization mechanism. The decreasing bulk concentration of PEG occurring during the constant volume diafiltration steps lowered these fluxes through a lower viscosity.

c) Flux and Passage Models

Figure 2:
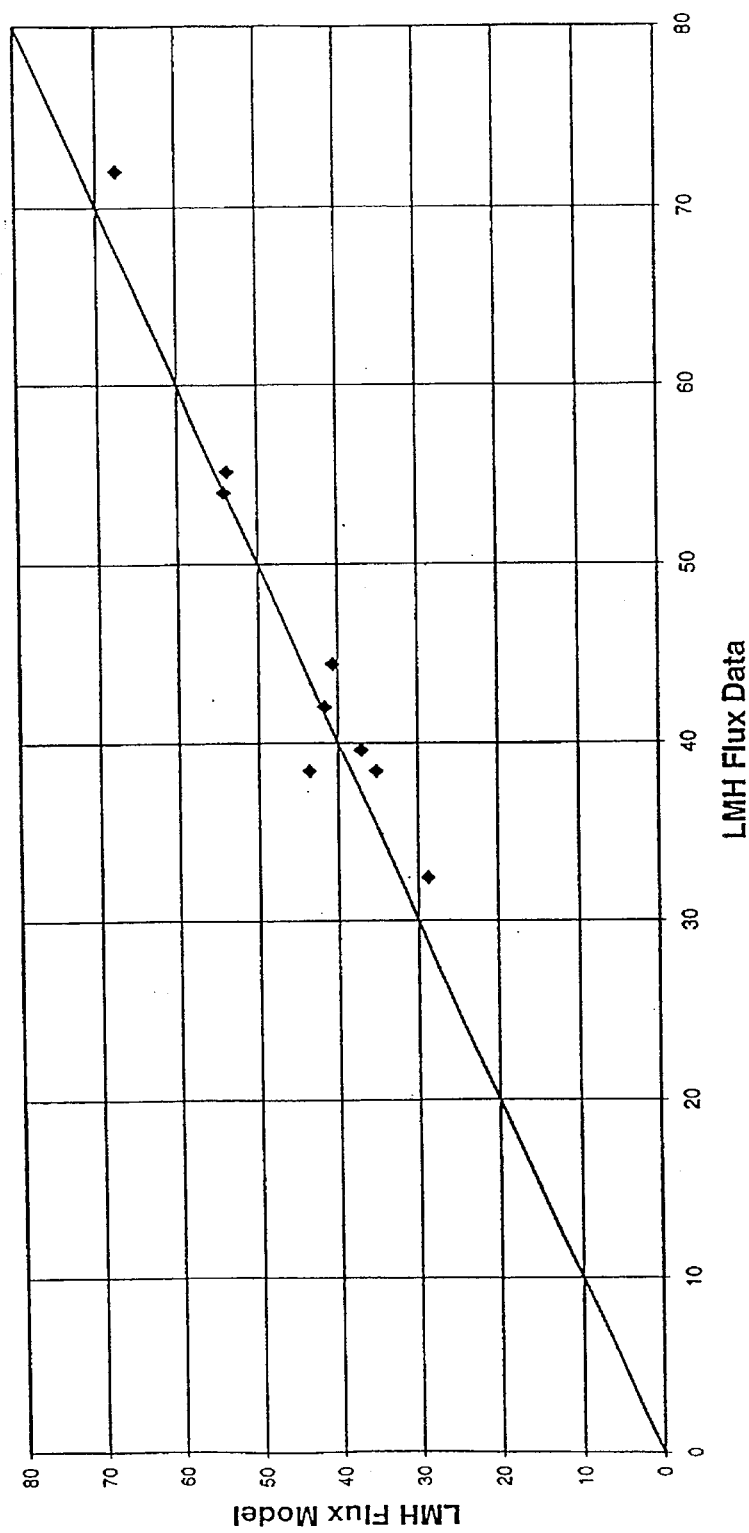
FIG. 2 is a graph comparing a flux model with experimental data for a sample solution involving the separation of polyethylene glycol from a high molecular weight protein according to Example 1.

The flux results were combined with the concentration data and used in a statistical regression to fit the flux model $$J = \frac{46.6 \cdot \ln(17.8/c_P)}{-(1 + .191 \cdot c_{PEG})} \; LMH,$$

for g/dL concentrations of protein $c_p$, and PEG $c_{PEG}$, respectively in g/dL. A comparison of the data and calculated values obtained from this model depicted in FIG. 2 show good agreement.

As described above, the passage models are taken as $\sigma=0$ and $\sigma_{PEG}=0.10$ for protein and PEG respectively, in this case independent of the concentration of either species.

d) Optimal Concentration Surface

Figure 3:
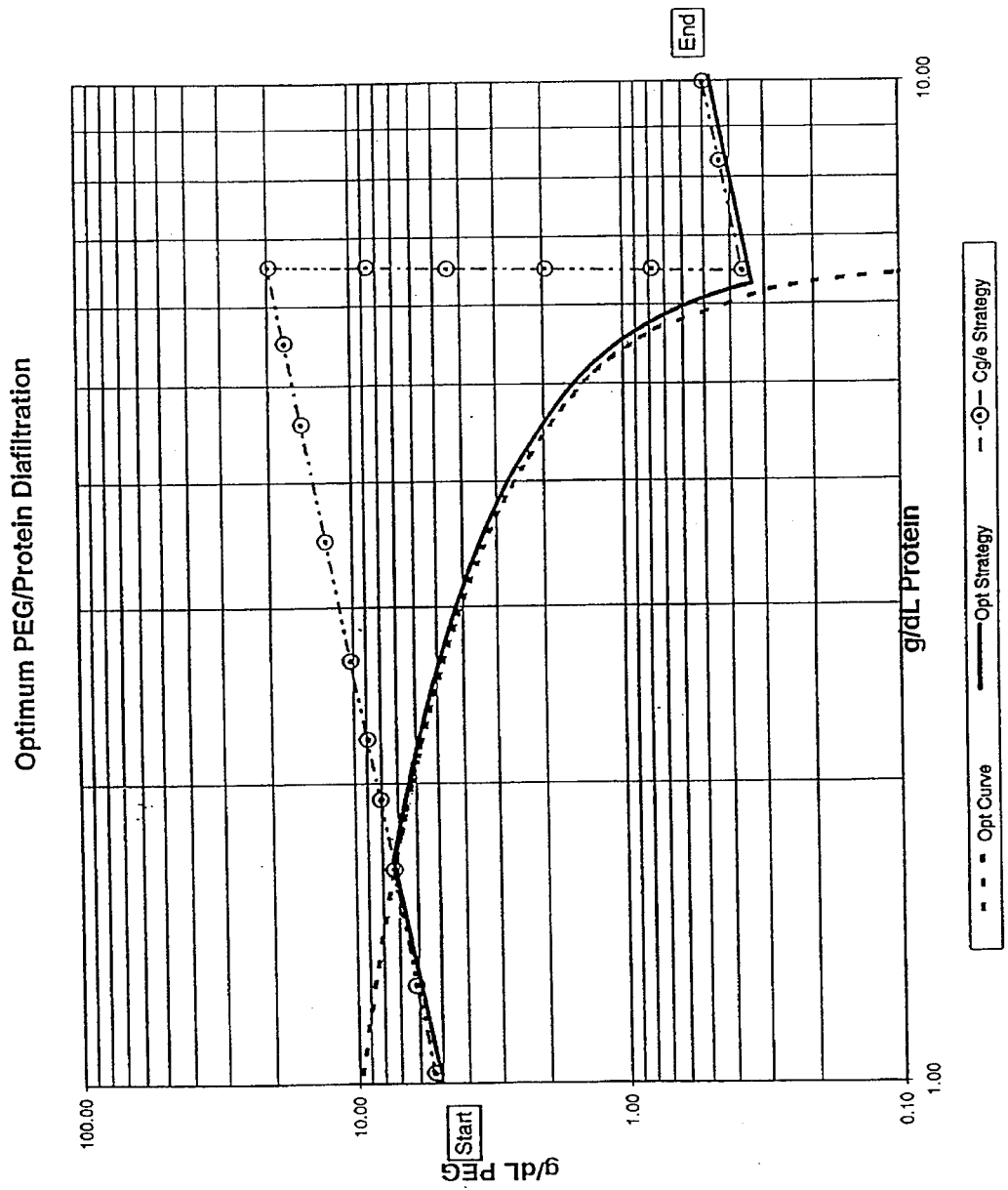
FIG. 3 is a graph comparing the optimum diafiltration strategy according to the present invention with that of a similar strategy according to a prior art scheme for the separation described in Example 1.

Using the method described in the present application, PEG removal was maximized by using a diafiltration strategy that maximizes the mass flux of PEG, i.e. the product of the solvent flux J, PEG passage $\sigma$, and PEG concentration in the system $c_{PEG}$. Application of the optimization equation for constant passages resulted in an optimum curve defined by $$g(c_{lp}, c_{PEG}) = \frac{1}{1 + .191 \cdot c_{PEG}} - \frac{1}{\ln(17.8/c_p)} = 0$$

or, $C_p = 17.8 e^{(-1-0.191 \cdot c_{PEG})}$. This curve is shown in FIG. 3 along with the $c_g/e$ strategy described in the prior art.

e) Optimal Diafiltration Strategy

The present strategy involved first concentrating the feed batch ($a=0$) to bring concentrations from their initial values of 1 g/dL protein and 5 g/dL PEG respectively to values on the optimal curve of 1.68 g/dL protein and 7.3 g/dL PEG. Second, movement along the optimal curve from the 1.68 g/dL protein and 7.3 g/dL PEG point to a 6.19 g/dL protein and 0.32 g/dL PEG point by was accomplished by varying the diafiltration rate from 84% of the permeate flow (partial concentration/partial diafiltration) smoothly up to 100% of the permeate flow in accordance with the formula:

$$a = 1/(1 + 0.191 \; c_{PEG}).$$

Third, movement from the 6.19 g/dL protein and 0.32 g/dL PEG point on the optimal curve to the final point of 10 g/dL protein and 0.5 g/dL PEG was accomplished by concentrating the final batch (a=0).

By comparison, the conventional strategy of diafiltering at $c_g/e$ involves concentrating the feed batch (a=0) to bring concentrations from their initial values of 1 g/dL protein and 5 g/dL PEG respectively to the protein $c_g/e$ value of 6.57 g/dL protein and 19.87 g/dL PEG. Second, the batch is constant volume diafiltered (a=1) to bring the PEG concentration down and move from the 6.57 g/dL protein and 19.87 g/dL PEG point to a 6.57 g/dL protein and 0.36 g/dL PEG point. Third, the batch is concentrated (a=0) to bring the concentration of protein up to its final value at 10 g/dL protein and 0.5 g/dL PEG.

f) Implementation Strategy

The diafiltration strategy described above can be implemented by monitoring the concentration of PEG in the system or permeate and varying the diafiltrate flow rate in accordance with keeping these concentrations on their optimal values over the course of processing. Namely, a=0 when $c_{PEG}$<7.3 g/dL in the system or 0.73 g/dL in the permeate a=1/(1+0.191·$c_{PEG}$) for 0.32 g/dL<$c_{PEG}$<7.3 g/dL in the system or 0.032 g/dL<$c_{PEG}$<0.73 g/dL PEG in the permeate a=0 for 0.32 g/dL<$C_{PEG}$<0.5 g/dL in the system or 0.032 g/dL<$C_{PEG}$<0.05 g/dL PEG in the permeate Another approach is to monitor the permeate flow over the course of processing and vary the diafiltrate flow accordingly to maintain the following setpoints.

a=0 when J>23.43 LMH a is manipulated to keep J=23.43 LMH constant until a=0.99 a=0 until J=12 LMH

Figure 4:
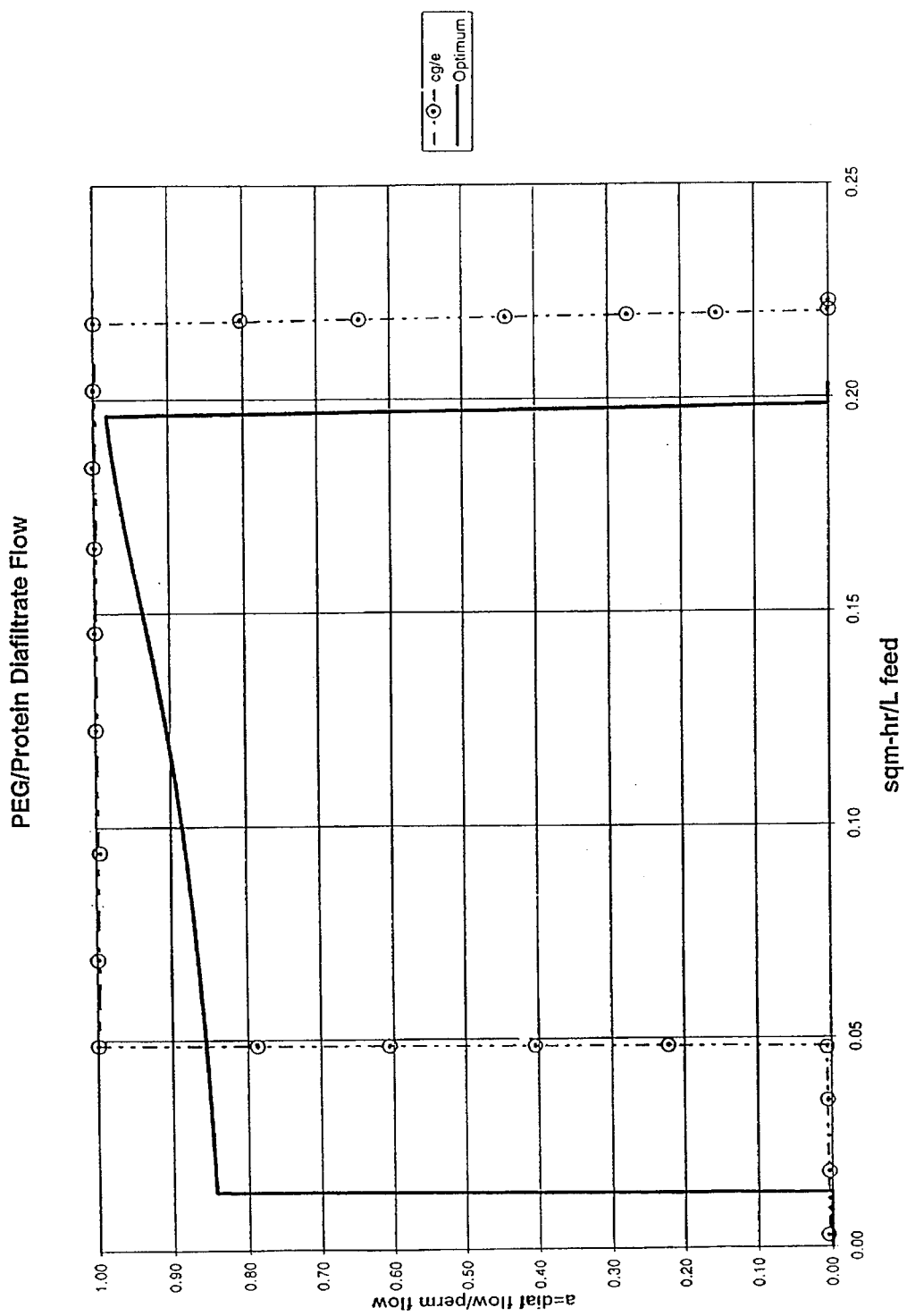
FIG. 4 is a graph showing the same comparison as that of FIG. 3 as a function of varying the diafiltration flow rate ratio over the time course of filtration processing.

Another approach is to prescribe how the flow rate ratio is to be varied over the time course of processing. This requires substitution of the diafiltration strategy, along with the flux and passage models, into the differential equations describing the system as:

volume: $\frac{dV}{dz} = J(a-1),$ protein concentration: $\frac{d\ln c_P}{dz} = -\frac{J}{V}(\sigma_P + a - 1)$ PEG concentration: $\frac{d\ln c_{PEG}}{dz} = -\frac{J}{V}(\sigma_{PEG} + a - 1)$ This system of equation was then solved using a simple Euler method with a small time step to obtain the time evolution of flow rates as shown in FIG. 4. The area-time requirements are 0.202 m²-hr per liter of feed for optimal strategy according to the present invention vs 0.223 m²-hr per liter of feed for the conventional $c_g/e$ prior art strategy, a 10% savings in performance.

Figure 5:
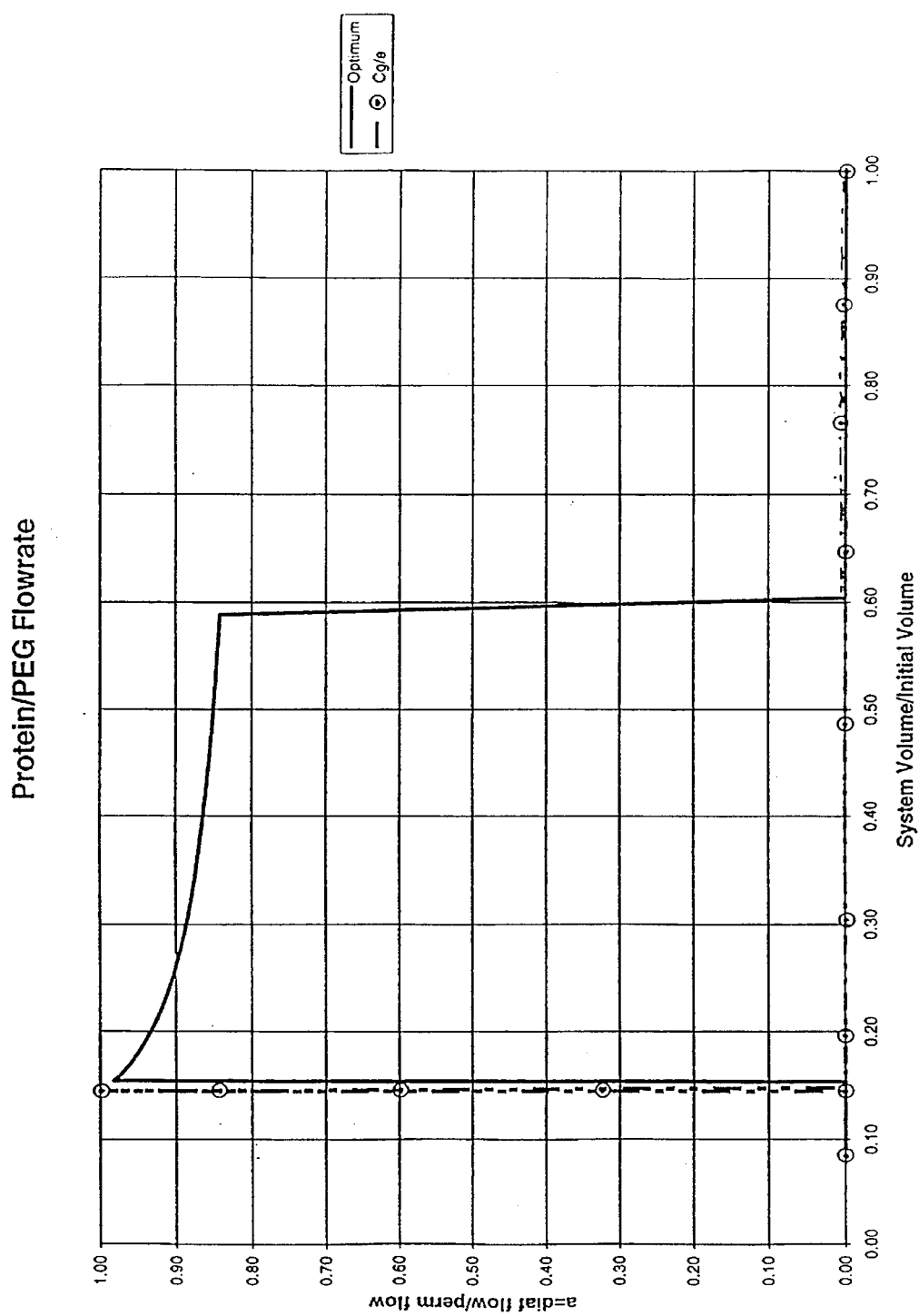
FIG. 5 is a graph showing the same comparison as that of FIG. 3 as a function of varying the system volume over the time course of filtration processing.

Another implementation strategy is to follow the volumes within the tank 12 over the course of processing. These volumes are obtained from the solution to the differential equations as described above. The control strategy is then given by FIG. 5 as flow rate ratio versus tank volume a(V).

EXAMPLE 2) Whey/Lactose Separation

In this example, data and analysis obtained from a published prior art paper on lactose removal from milk by Rajagopalan, N. and Cheryan, M., as "Process Optimization in Ultrafiltration: Flux-Time Considerations in the Purification of Macromolecules", Chem. Eng. Comm. 106 (1991) 57 was used. In this paper, the authors attempted to find the optimum diafiltration strategy by using the approach suggested by Ng et. al. of concentrating to some point, then diafiltering at constant volume. The object of this example is to improve upon this published result using the optimum strategy described in this patent application.

a) Process Definition

These investigators reconstituted non-fat dry milk powder with distilled deionized water to produce a 9.5% by wt total solids content milk solution. This feed solution contained 3.3 wt % protein and 5.5 wt % lactose. The final product spec was 0.64% lactose. The test stand was configured as shown in FIG. 1 and contained a pilot-plant scale Romicon hollow fiber module (HF15-43-PM50) with a molecular weight rating of 50K Daltons and membrane area of 1.4 m². This ultrafiltration membrane is designed to retain protein and pass lactose. Data were obtained at 50° C., 1.27 m/s recirculation velocity, 134 kPa transmembrane pressure, and a pH 6.7.

b) Flux and Passage Data

Three processing runs were made consisting of: a constant volume diafiltration at 3.3 wt % protein; a 2 fold concentration to 6.8 wt % protein followed by a constant volume diafiltration; and a 2.76 fold concentration to 9 wt % protein followed by a constant volume diafiltration. Pure water was used for the diafiltrate. Fluxes were measured over the course of each run and concentration data were obtained from the analysis of samples taken during each run.

c) Flux and Passage Models

The protein and lactose concentration data showed 100% lactose passage and 0% protein passage. Flux data were combined with these concentration data using a statistical regression to obtain the flux model: J=63.24–12.439 ln($c_P$)–7.836 ln($c_L$) LMH for concentrations of protein $c_P$ and lactose $c_L$ respectively in wt %.

d) Optimal Concentration Surface

Figure 6:
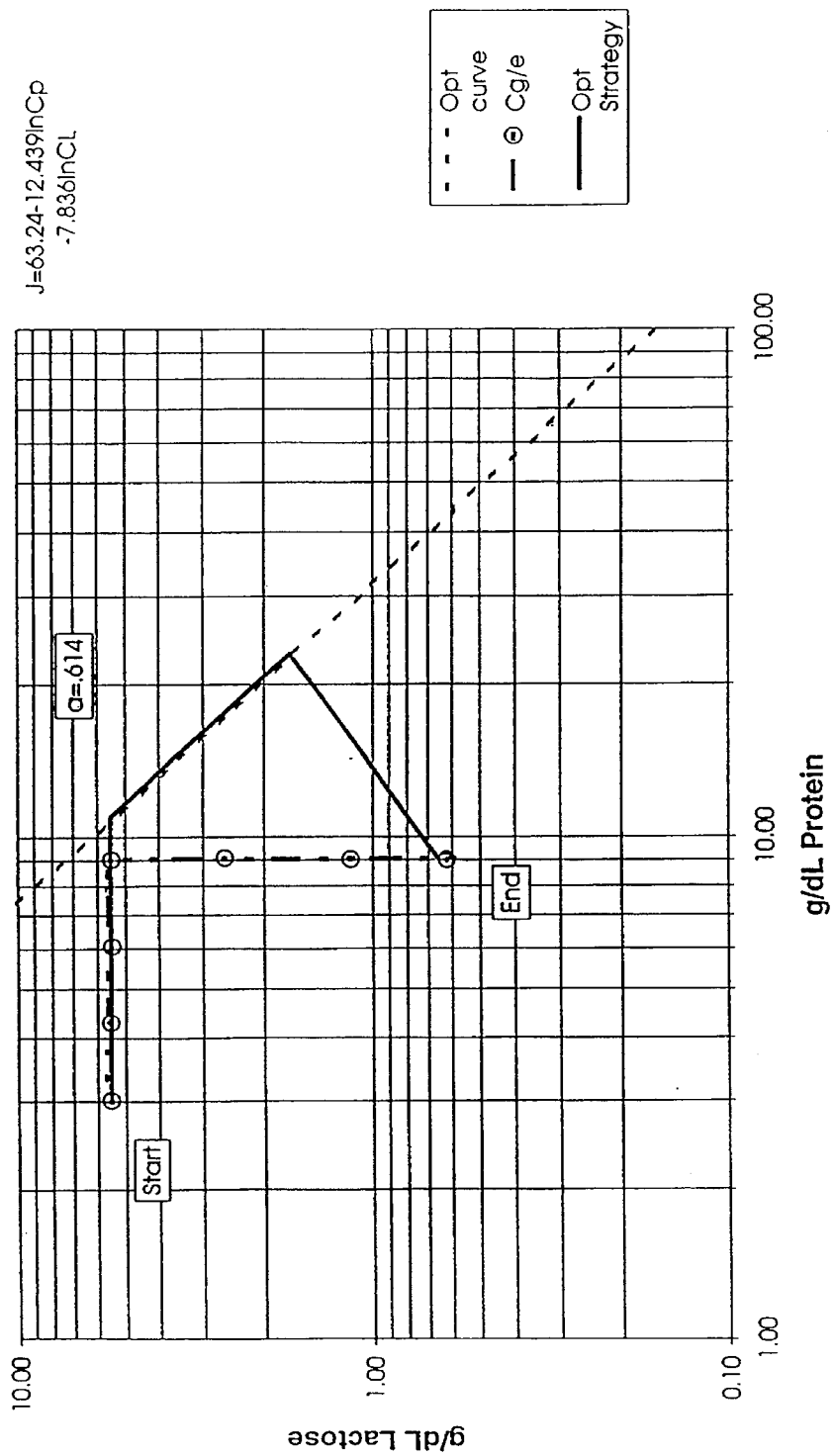
FIG. 6 is a graph comparing the results obtained for the separation of Example 2 using the strategy of the present invention with those of a prior art strategy.

Substitution of these equations for the flux, and passages with respect to concentration into the optimization equation (Equation 1) resulted in an optimum curve defined by $$g(c_P, c_L) = 1 - \frac{12.439}{J_{opt}} - \frac{7.836}{J_{opt}} = 0$$

or $J_{opt}$=20.28 LMH and $C_P$=31.63$c_L^{-0.63}$ wt %. This curve is shown in FIG. 6 together with the curve representing the constant volume diafiltration at $c_g/e$ strategy as determined by Rajagopalan and Cheryan.

e) Optimal Diafiltration Strategy

This strategy involves first concentrating the feed batch (a=0) to bring concentrations from their initial values of 3.3 g/dL protein and 5.5 g/dL lactose respectively to values on the optimal curve of 10.98 g/dL protein and 5.5 g/dL lactose. Second, movement along the optimal curve from the 10.98 g/dL protein and 5.5 g/dL lactose point to a 23 g/dL protein and 1.7 g/dL lactose point is accomplished by keeping the diafiltration rate at 61.4% of the permeate flow (partial concentration/partial diafiltration). Third, movement from the 23 g/dL protein and 1.7 g/dL lactose point on the optimal curve to the final point of 9.04 g/dL protein and 0.64 g/dL lactose is achieved by diluting the final batch (a→∞).

By comparison, the conventional strategy of diafiltering at $c_g/e$ involves concentrating the feed batch (a=0) to bring concentrations from their initial values 3.3 g/dL protein and 5.5 g/dL lactose respectively to the protein $c_g/e$ value of 9.04 g/dL protein and 5.5 g/dL lactose. Second, the batch is constant volume diafiltered (a=1) to bring the lactose concentration down and move from the 9.04 g/dL protein and 5.5 g/dL lactose point to a 9.04 g/dL protein and 0.64 g/dL lactose point.

f) Implementation Strategy

The diafiltration strategy described above can be implemented by monitoring the concentration of lactose and protein in the system or permeate and varying the diafiltrate flow rate in accordance with keeping these concentrations on their optimal values over the course of processing. Namely, a=0 when $c_p$<10.98 g/dL in the system, or $c_1$>5.5 g/dL in the system or permeate a=0.614 for 10.98$c_p$<23 g/dL in the system, or 5.5>$c_1$>1.7 g/dL in the system or permeate a→∞ for 0.64 g/dL <$c_1$<1.7 g/dL in the system or permeate or 9.04<$c_p$<23 g/dL in the system Another approach is to monitor the permeate flow over the course of processing and vary the diafiltrate flow accordingly to maintain the following setpoints:

a=0 when J>20.28 LMH a=0.614 to keep J=20.28 LMH constant a→∞ until J=39.14 LMH

Figure 7:
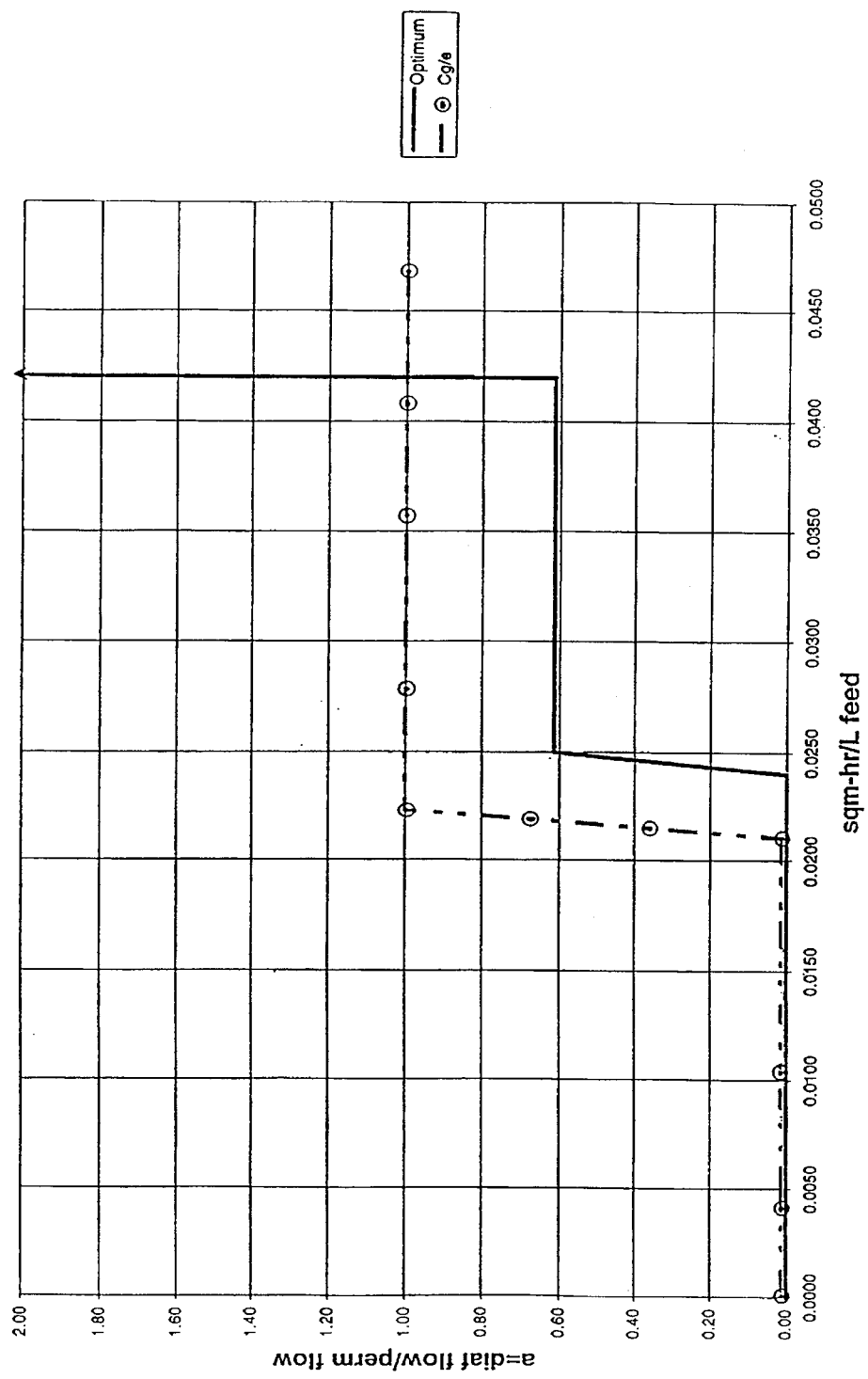
FIG. 7 is a graph comparing the results obtained for the separation of Example 2 as a function of varying the diafiltration flow rate ratio over the time course of filtration processing.

Another approach is to prescribe how the flow rate ratio is to be varied over the time course of processing. This requires substitution of the diafiltration strategy, along with the flux and passage models, into the differential equations describing the system as:

volume: $\quad \dfrac{dV}{dz} = J(a-1),$ protein concentration: $\quad \dfrac{d\ln c_p}{dz} = -\dfrac{J}{V}(\sigma_p + a - 1)$ lactose concentration: $\quad \dfrac{d\ln c_l}{dz} = -\dfrac{J}{V}(\sigma_l + a - 1)$ This system of equations was then solved using a simple Euler method with a small time step to obtain the time evolution of flow rates as shown in FIG. 7. Implementation of the optimized strategy reduces the area-time requirements from 0.047 m²-hr per liter of feed to 0.043 m²-hr per liter of feed, a 10% performance improvement.

Figure 8:
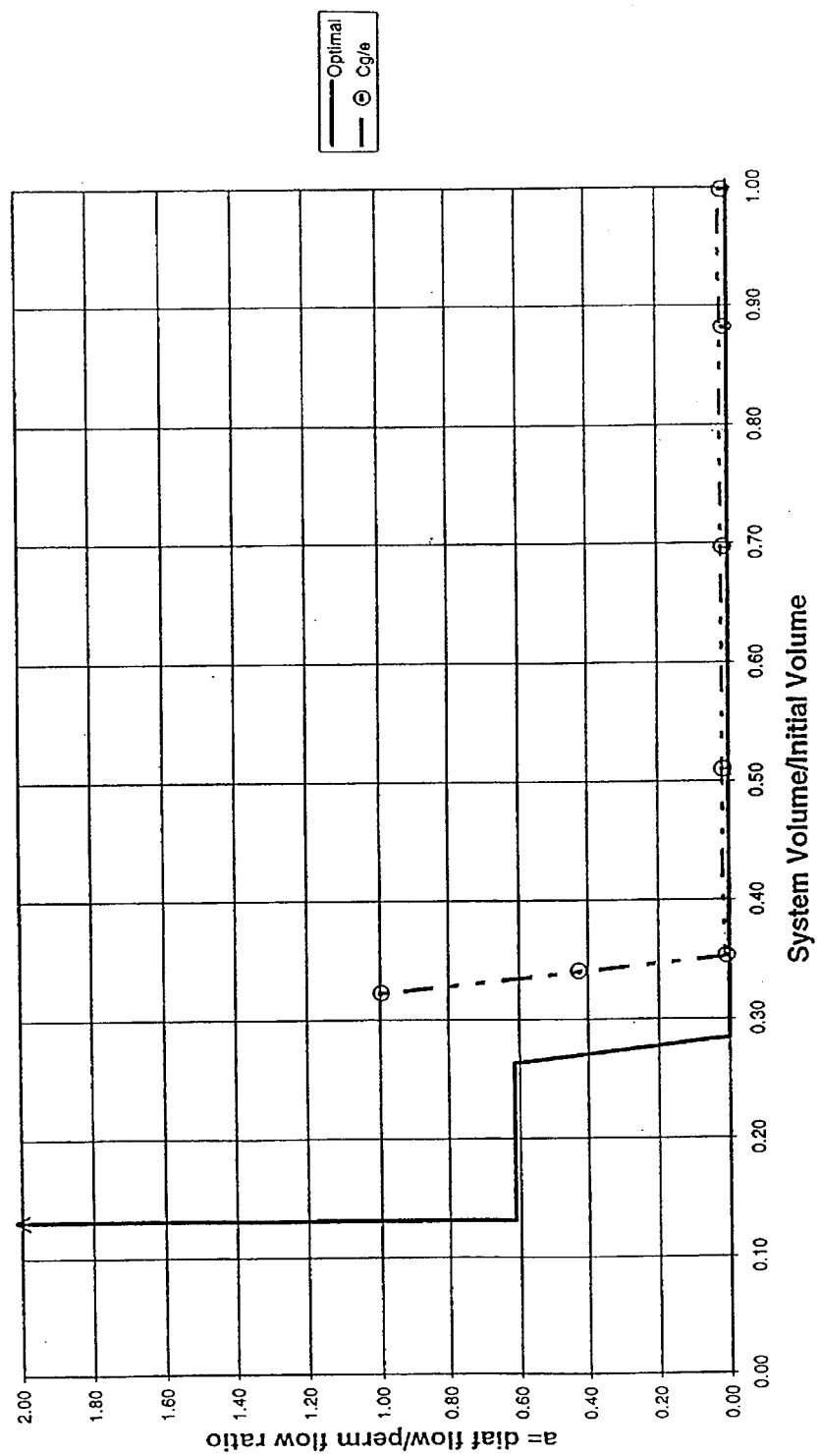
FIG. 8 is a graph comparing the results obtained for the separation of Example 2 as a function of varying the system volume over the time course of filtration processing.

Another implementation strategy is to follow the system volumes over the course of processing. These volumes are obtained from the solution to the differential equations as described above. The control strategy is then given by FIG. 8 as a(V).

EXAMPLE 3) Radiopaque/Ethylene Glycol Separation a) Process Definition:

A reverse osmosis membrane was used to retain a radiopaque product, referred to here as component B, while allowing an ethylene glycol contaminant, component A, to pass through. The feed solution contains 12 g/dL of component B and 0.5 g/dL of component A. The final product is required to have a maximum of 0.01 g/dL of component A and a minimum concentration of component B of 40 g/dL. Data were obtained using a 3 sqft Millipore R76A spiral reverse osmosis module at approximately 20° C., 400 psig inlet pressure, and 4 Lpm crossflow.

b) Flux and Passage Data

A test stand, configured as shown in FIG. 1 (millipore Corp. PROLAB system), containing a 3 sqft spiral, was flushed with RO/DI water. After ensuring that water permeability and $MgSo_4$ retention met the manufacturers test specifications, the spiral was flushed out once again with RO/DI water. After draining the water, the tank was charged with 4 L of the feed solution. A sequence of three volumetric reduction concentration operations and a constant volume diafilitration operation were performed using RO/DI diafiltration fluid. This sequence allowed for the measurement of flux and passages of components A and B over a range of feed solution concentrations. Component A and B assays were performed on samples from the feed tank and permeate stream taken after each step in this process.

Temperature corrected fluxes decreased during the concentration steps and remained constant during the diafilitration step. The increased component B concentration occurring during the concentration steps is responsible for lowering these fluxes through a polarization mechanism. The decreasing bulk concentration of component appeared to have no significant effect on flux indicating that flux is insensitive to component A at these low concentrations.

The passage of component B increased slightly as component B concentrations increased from 12 g/dL to >50 g/dL. The passage of component B remained constant during diafiltration showing that it is insensitive to component A concentration. The passage of component A increased with increasing component B concentration. In fact, the data indicated that at high enough component B concentrations, the concentration of A in the permeate could exceed the concentration of A in the system for a passage of A greater than 100%. The passage of component A remained constant during diafiltration showing that it is also insensitive to component A concentration.

c) Flux and Passage Models

The flux through the membrane depends only on the concentration of component B and was fit using statistical regression to the flux model: J=−29.19 ln($c_B$)+118.1 LMH with $c_B$ in g/dL and $r^2$=0.975.

Figure 9:
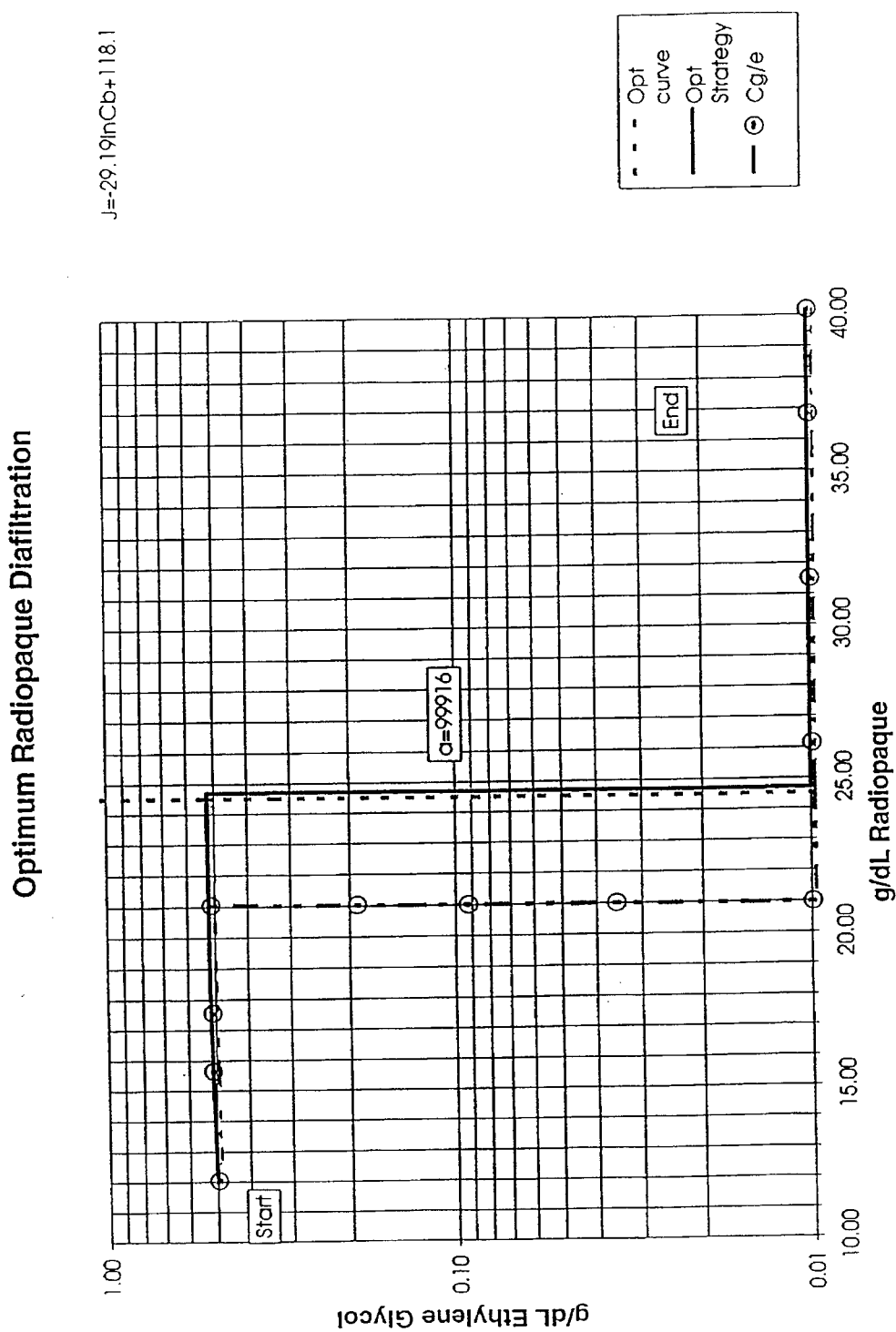
FIG. 9 is a graph comparing the results obtained for the separation of Example 3 using the strategy of the present invention with those of a prior art strategy.

Passage of component A is dependent only on the concentration of component B and was fit to the linear passage model: $\sigma_A$=0.0073$c_B$+0.813 with $r^2$=0.992. Note that at large values of $c_B$ this passage can exceed 1.0. Passage of component B is dependent only on the concentration of B and was fit to the linear passage model: $\sigma_B$=7.1×10⁻⁵$c_B$−0.00090 with $r^2$=0.947 and corrected for small values of $c_B$ so that this value was always≥0.

d) Optimal Concentration Surface:

Application of the optimization equation for constant passages results in an optimum curve defined by $$g(c_A, c_B) = 1 + \frac{-29.19}{-29.19\ln(c_B) + 118.1} + \frac{.0073c_B}{.0073c_B + .813} = 0$$

which reduces to a single operating point defined by $c_B$=24.5 g/dL as shown in FIG. 9. At this point, $J_{opt}$=24.5 LMH, $\sigma_{Aopt}$=0.992, and $\sigma_{Bopt}$=0.00084. Note for comparison that the $C_g$/e strategy reduces to a constant volume diafiltration at the point $c_B$=21.03 g/dL. The increasing passage of A with increasing concentrations of B has shifted the optimum to a higher value of $c_B$.

e) Optimal Diafiltration Strategy

The optimal strategy is to move from the initial point concentrations of 12 g/dL of component B and 0.5 g/dL of component A to the optimal point of 24.5 g/dL of component B and 0.52 g/dL of component A by performing a concentration run (a=0). The rate of buffer addition was then controlled to maintain component B concentration at this optimum value. Since component B passes slightly, this requires a=0.99916. This brings the concentration of A from 0.52 g/dL down to 0.01 g/dL. The batch was then concentrated (a=0) to obtain final values of 0.01 g/dL of component A and 40 g/dL of component B.

By comparison, the conventional strategy of diafiltering at $c_g$/e involves concentrating the feed batch (a=0) to bring concentrations from their initial values of 12 g/dL of component B and 0.5 g/dL of component A respectively to the $c_g$/e value of 21.03 g/dL of component B and 0.52 g/dL of component A. Second, the batch is constant volume diafiltered (a=1) to bring the component A concentration down and move from 21.03 g/dL of component B and 0.52 g/dL of component A to a 20.98 g/dL of component B and 0.01 g/dL of component A point.

f) Implementation Strategy

The diafiltration strategy described above can be implemented by monitoring the concentration of A or B in the system or permeate and varying the diafiltrate flow rate in accordance with keeping these concentrations on their optimal values over the course of processing. Namely, a=0 when $c_B$<24.5 g/dL in the system a=0.99916 for 0.01<$c_A$<0.52 g/dL in the system a=0 for 24.5 g/dL<$c_B$<40.0 g/dL in the system Another approach is to monitor the permeate flow over the course of processing and vary the diafiltrate flow accordingly to maintain the following setpoints:

a=0 when J>24.5 LMH a=0.99916 to keep J=24.5 LMH constant a=0 until J=10.4 LMH

Another approach is to prescribe how the flow rate ratio is to be varied over the time course of processing. This requires substitution of the diafiltration strategy, along with the flux and passage models, into the differential equations describing the system as:

volume: $\quad \frac{dV}{dz} = J(a - 1),$

A concentration: $\quad \frac{d\ln c_A}{dz} = -\frac{J}{V}(\sigma_A + a - 1)$

B concentration: $\quad \frac{d\ln c_B}{dz} = -\frac{J}{V}(\sigma_B + a - 1)$

Figure 10:
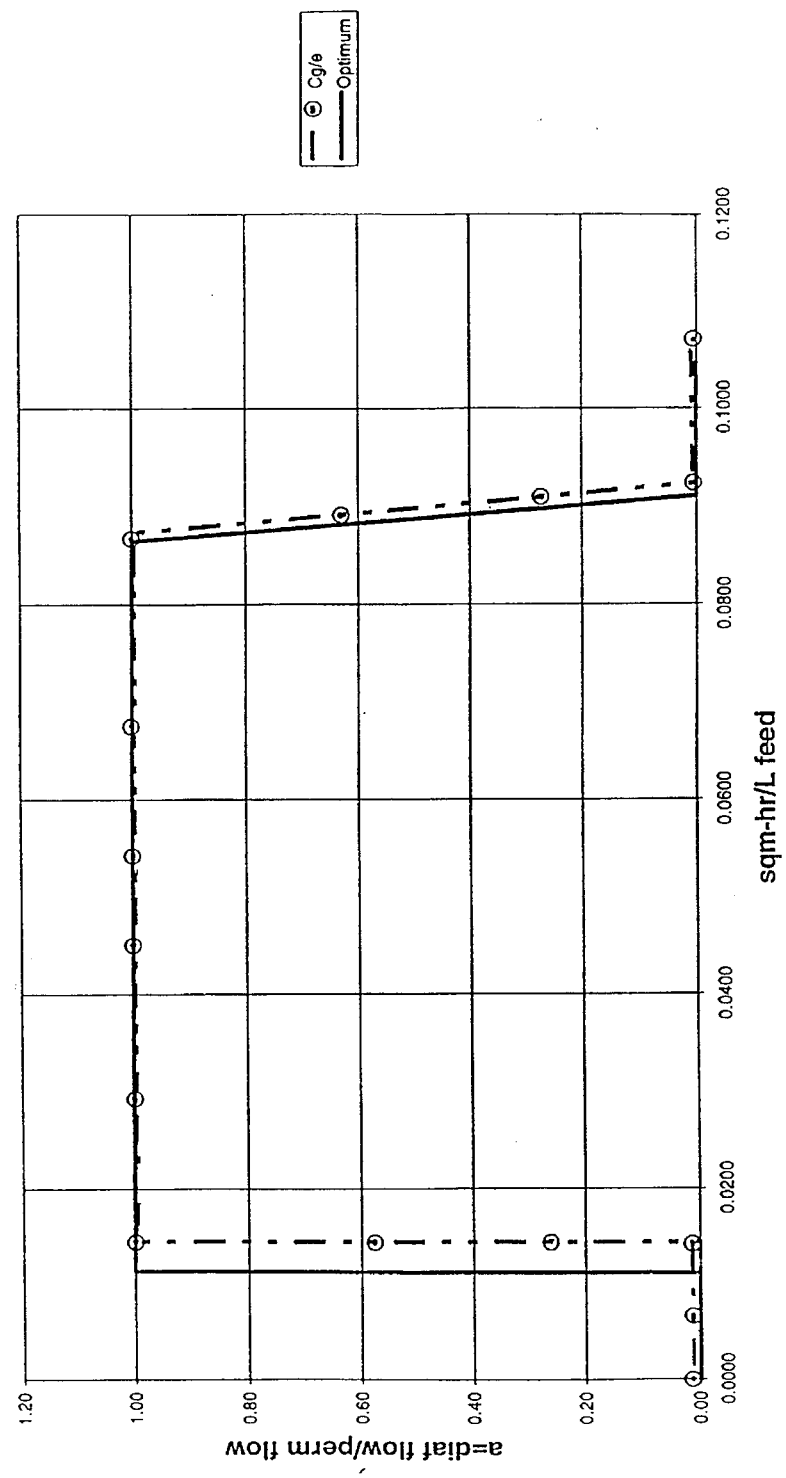
FIG. 10 is a graph comparing the results obtained for the separation of Example 3 as a function of varying the diafiltration flow rate ratio over the time course of filtration processing.

This system of equations was then solved using a simple Euler method with a small time step to obtain the time evolution of flow rates as shown in FIG. 10. Implementation of the optimized strategy reduces the area-time requirements from 0.1047 m²-hr per liter of feed to 0.1028 m²-hr per liter of feed, a 2% performance improvement.

Figure 11:
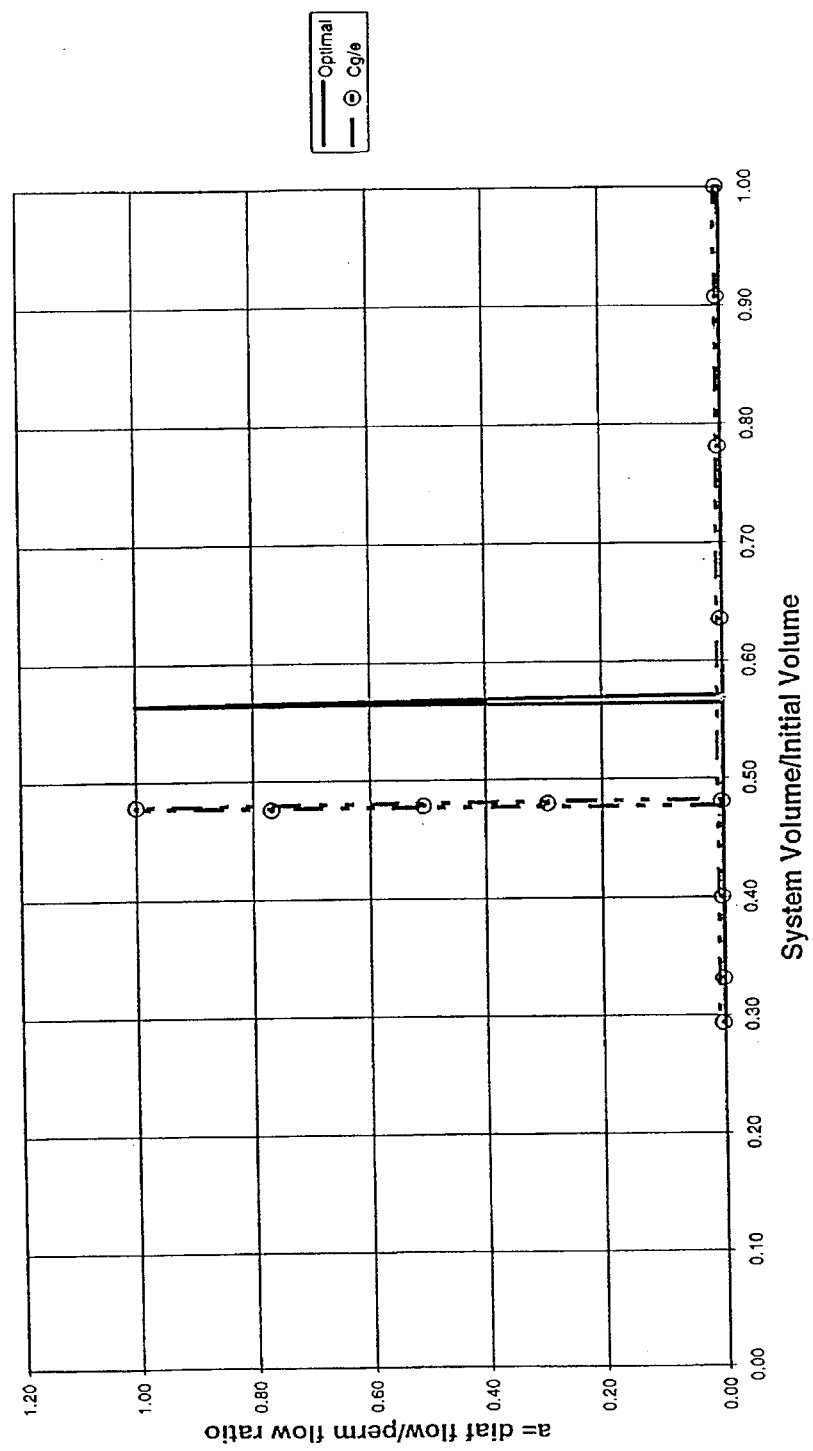
FIG. 11 is a graph comparing the results obtained for the separation of Example 3 as a function of varying the system volume over the time course of filtration processing.

Another implementation strategy is to follow the system volumes over the course of processing. These volumes are obtained from the solution to the differential equations as described above. The control strategy is then given by FIG. 11 as a(V).

EXAMPLE 4) Wine Dealcoholization a) Process Dermition:

A reverse osmosis membrane was used to retain sugars and flavors in wine while allowing the ethanol to pass through. The wine feedstock contained 12% ethanol, 2% sugar and the final product contained 0.5% ethanol, 2% sugar. Data were obtained using a 4 sqft Millipore Nanomax™-95 spiral reverse osmosis module at 20° C., 600 psig inlet pressure, and 4 Lpm cross flow.

b) Flux and Passage Data

A test stand, configured as shown in FIG. 1 (Millipore Corp. PROLAB system), containing a 4 sqft spiral, was flushed with RO/DI water. After ensuring that water permeability and NaCl retention met the manufacturers test specifications, the spiral was flushed out once again with RO/DI water. After draining the water, the tank was charged with 2 L of the feed solution. A sequence of two dilution operations were performed using RO/DI diafiltration fluid. This sequence allowed for the measurement of flux and passages of components ethanol and sugar over a range of feed solution concentrations. Ethanol and sugar assays were performed on samples from the feed tank and permeate stream taken after each step in this process.

Dilution increased the fluxes through a polarization mechanism. The passage of ethanol increased as ethanol concentrations increase. There was no measurable passage of sugar.

c) Flux and Passage Models

Figure 12:
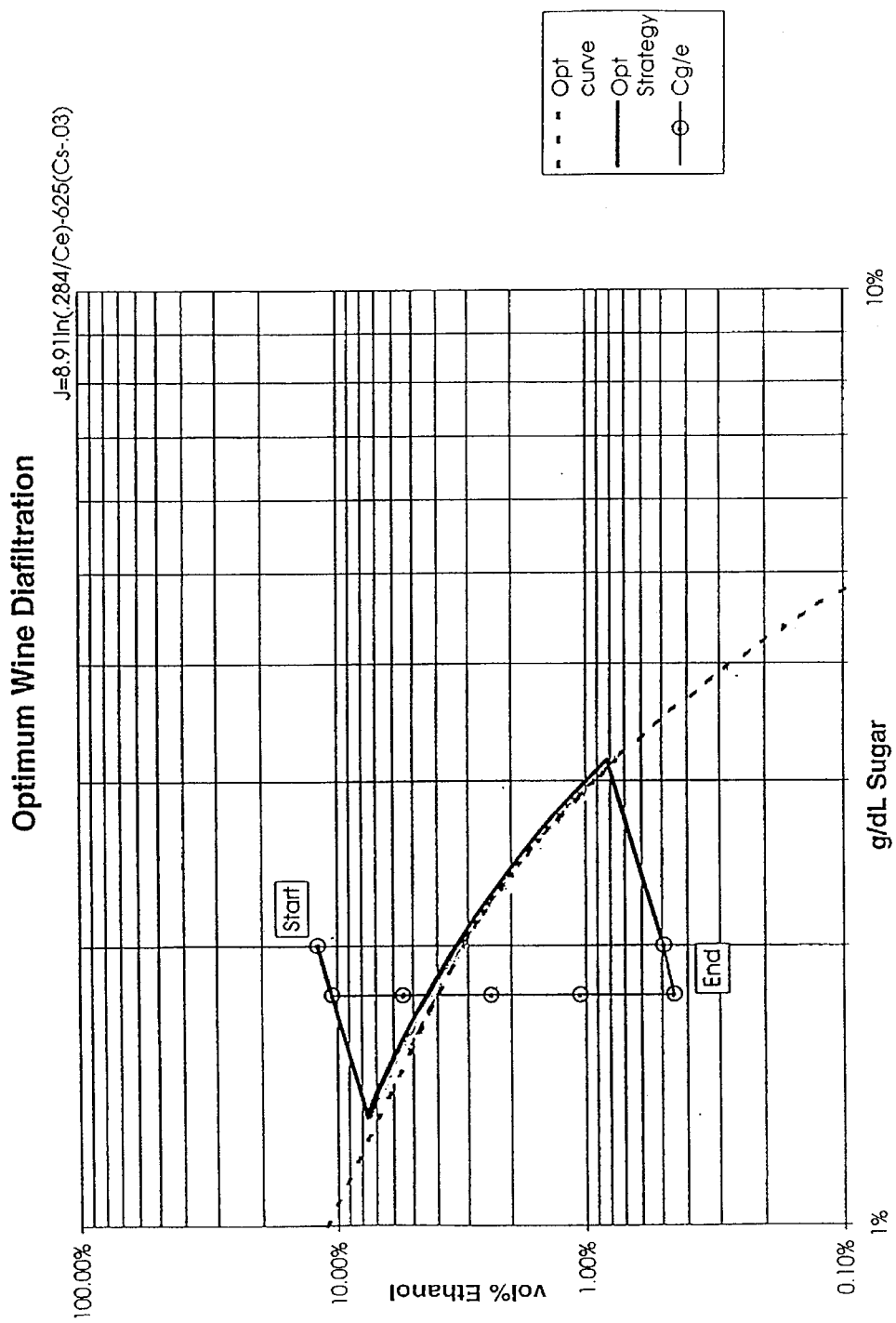
FIG. 12 is a graph comparing the optimum diafiltration strategy according to the present invention with that of a similar strategy according to a prior art scheme for the separation described in Example 4.

Passage of ethanol data was fit using statistical regression to the model: $\sigma_{eth}=0.946 c_{eth}^{0.289}$ for $c_{eth}$ in vol % with an $r^2$=0.882. Passage of sugars was constant at $\sigma_s$=0. The flux data was fit using statistical regression to the model: J=8.91·ln(0.284/$c_{eth}$)−625·($c_s$−0.02)LMH for $c_{eth}$ in vol% and $c_s$ in g/dL with an $r^2$=0.999.

d) Optimal Concentration Surface:

Application of the optimization equation for constant passages results in an optimum curve defined by $$g(c_{eth}, c_s) = 1 + \frac{-8.91 - 625c_s}{J_{opt}} + .289 = 0$$

or $C_{eth} = 0.388e^{-124.6c_s}$ as shown in FIG. 12.

e) Optimal Diafiltration Strategy

The optimum strategy is to move from the initial point at 12.0 vol% ethanol, 2% sugar to a point on the optimum curve at 7.56 vol % ethanol, 1.31% sugar, by performing a dilution step (a→∞) with RO/DI water. Then, the optimum curve was followed from the 7.56 vol % ethanol, 1.31% sugar point to a 0.82 vol % ethanol, 3.15% sugar point by operating at a diafiltration ratio of $$a = 1 + \frac{.946c_e^{.289}}{\ln(c_e) - .0538}.$$

This removed the required amount of ethanol. A dilution step (a→∞) was used to move off the optimum curve at 0.82 vol% ethanol, 3.15% sugar and restore the solution to the original feedstock volume at 0.5 vol % ethanol and 2% sugar.

By comparison, the conventional strategy of diafiltering at $c_g/e$ involves diluting the feed batch (a→∞) by 15% to bring ethanol concentration from its initial values of 12 vol% to the $c_g/e$ value of 10.44%. Second, the batch is constant volume diafiltered (a=1) to bring the ethanol concentration down. Third, the batch is concentrated by 15% to bring it back to the original volume.

f) Implementation Strategy

The diafiltration strategy described above can be implemented by monitoring the concentration ethanol in the system and varying the diafiltrate flow rate in accordance with keeping these concentrations on their optimal values over the course of processing. Namely, $a \to \infty$ when $12\% > c_{eth} > 7.56$ vol % in the system $a = 1 + \dfrac{.946c_e^{.289}}{\ln(c_e) - .0538}$ for $7.56\% > c_{eth} > .82$ vol % in the system $a \to \infty$ for $0.5\% < c_{eth} < .82$ vol % in the system Note that the fluxes do not remain constant in this case and that control based on keeping flux constant is not appropriate.

Another approach is to prescribe how the flow rate ratio is to be varied over the time course of processing. This requires substitution of the diafiltration strategy, along with the flux and passage models, into the differential equations describing the system as:

volume: $\dfrac{dV}{dz} = J(a - 1)$

Figure 13:
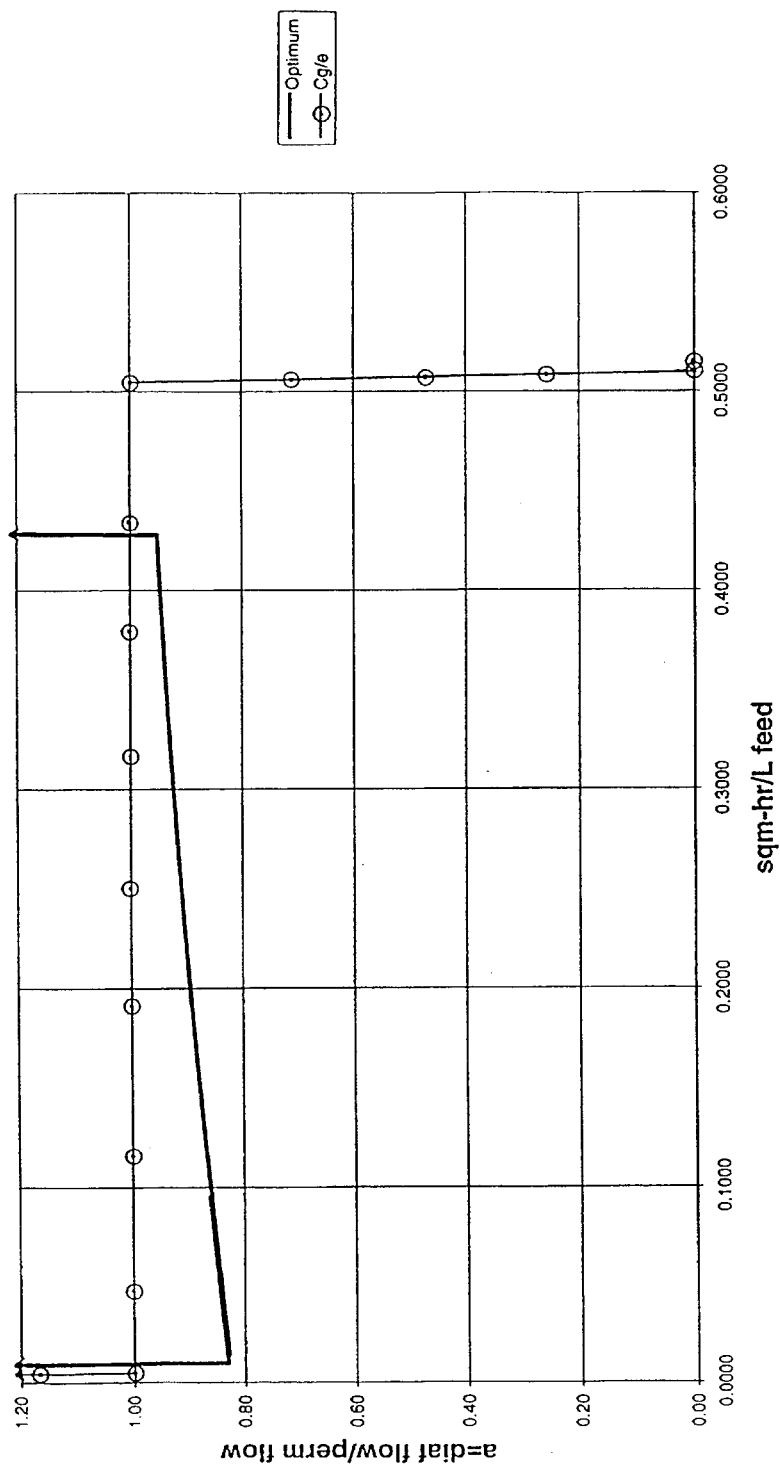
FIG. 13 is a graph comparing the results obtained for the separation of Example 4 as a function of varying the diafiltration flow rate ratio over the time course of filtration processing.

Ethanol concentration: $\dfrac{d\ln c_{eth}}{dz} = -\dfrac{J}{V}(\sigma_{eth} + a - 1)$ Sugar concentration: $\dfrac{d\ln c_s}{dz} = -\dfrac{J}{V}(\sigma_s + a - 1)$ This system of equations is solved directly to obtain the variation of the system volume and concentrations with time. These values provide the data to prescribe the diafiltration flow ratio variation with time shown in FIG. 13. Note that the optimum strategy requires 0.4375 sqm-hrs/L feed to accomplish this purification while the Cg/e strategy requires 0.5137 sqm-hrs/L feed, a 15% savings.

The prescribed diafiltration flow ratio with system volume is shown in FIG. 14 as another possible control strategy.

Although the invention has been described in detail above, this is solely for purposes of illustration should not be considered to be limitations therefore as modifications may become apparent to those of skill in the art without departing from the scope of the invention as defined in the accompanying claims.

I claim:

1. A process for optimizing the performance of a filtration system during a filtration run comprising the steps of:

a. delivering a liquid sample containing concentrations of two or more components in a solvent to be separated to an inlet portion of a filtration device having membrane separation means to produce a permeate stream passing through said separation means and the concentration of each of said two or more components in said inlet portion being sufficient to produce polarization at a given time during said filtration run;

b. maximizing the mass flux maximizing the mass flux of one of said two or more components in said permeate stream by controlling the flow rate of a second liquid to said inlet portion of said filtration device and adjusting over time during said filtration run said flow rate of said second liquid in response to changes in said sufficiency to effectively control within a predetermined range the concentrations of said two or more components in said inlet portion to produce an optimum control response which maximizes the mass flux of said one component in said permeate stream; and c. recovering at least one of said two or more components.

2. The process of claim 1 wherein the step of adjusting said flow rate comprises using continuous feedback control to produce a smooth, time-varying response representative of said optimum control response.

3. The process of claim 1 wherein the step of adjusting said flow rate comprises providing a series of finite, sequential dilution and concentration steps over time to produce an average flow rate value which represents an approximation of said optimum control response.

4. The process of claim 1 wherein the mass flux of said one component in said permeate stream is maximized over time during said filtration run by maintaining the concentrations of components in said inlet portion in accordance with the following equation:

$$g(c_i) = \left[ 1 + \Sigma_i \frac{\partial \ln J}{\partial \ln c_i} + \Sigma_i \frac{\partial \ln \sigma_A}{\partial \ln c_i} \right] = 0$$

wherein:

$g(c_i)$ = a dimensionless relation between component concentrations $c_i$ = concentration of component I in the permeate J = solvent flux $\sigma_A$ = passage of component A.

5. The process of claim 4 wherein the flow rate of said second liquid is controlled according to the following equation:

$$a(c_i)=1-\{\Sigma_i\sigma_i[\partial g/\partial \ln c_i]\}/\{\Sigma_i[\partial g/\partial \ln c_i]\}$$

wherein:
 a=a dimensionless constant representing the second liquid to permeate flow rate ratio
 $c_i$=concentration of component i in the system
 $\sigma_i$=passage of component i.

6. The process of claim 5 including the step of conducting either a pure concentration or pure dilution mode of operation prior to operating according to the equation of claim 4.

7. The process of claim 5 including the step of conducting either a pure concentration or pure dilution mode of operation after operating according to the equation of claim 4.

8. The process of claim 5 including the steps of conducting either a pure concentration or pure dilution mode of operation both prior to and after operating according to the equation of claim 4.

9. The process of claim 1 wherein said filtration system is a tangential flow filtration system including a feed reservoir, a retentate component stream and means for recirculating said retentate stream to said reservoir.

10. The process of claim 1 wherein said second liquid whose flow rate is to be controlled is a diafiltrate solution added to said inlet portion.

11. The process of claim 1 wherein the control of the flow rate of said second liquid maintains component concentrations in said inlet portion within 20% of the concentration given by a predetermined relationship between concentrations of the components, solvent flux and passage of a selected component.

12. A process for optimizing the performance of a tangential flow filtration system during a filtration run comprising the steps of:
 a. introducing into a reservoir a liquid sample containing concentrations of two or more components in a solvent to be separated;
 b. delivering said sample to an inlet portion of a membrane separation means to produce a permeate stream passing through said separation means, a retentate component stream and the concentration of each of said two or more components in said reservoir being sufficient to produce polarization at a given time during said filtration run;
 c. recirculating said retentate component stream to said reservoir;
 d. maximizing the mass flux of one of said two or more components in said permeate stream by controlling the flow rate of a second liquid to said reservoir and adjusting over time during said filtration run said flow rate of said second liquid in response to changes in said sufficiency to effectively control within a predetermined range the concentrations of said two or more components in said inlet portion to produce an optimum control response which maximizes the mass flux of said one component in said permeate stream; and
 e. recovering at least one of said two or more components.

13. The process of claim 12 wherein the second liquid comprises a difiltrate solution and wherein the mass flux maximizing step is accomplished by controlling the flow rate of diafiltration solution added to said reservoir.

14. The process of claim 12 wherein the second liquid comprises a difiltrate solution and wherein the mass flux maximizing step is accomplished by controlling the volume per unit time of diafiltrate solution added to said reservoir.

15. The process of claim 12 wherein the mass flux of said one component in said permeate stream is maximized over time during said filtration run by maintaining the concentrations of components in said reservoir in accordance with the following equation:

$$g(c_i)=[1+\Sigma_i(\partial \ln J/\partial \ln c_i)+\Sigma_i(\partial \ln \sigma_A/\partial \ln c_i)]=0$$

wherein:
 $g(c_i)$=a dimension less relation between component concentrations
 $c_i$=concentration of component I in the permeate
 J=solvent flux
 $\sigma_A$=a dimensionless constant denoting passage of component A.

16. The process of claim 15 wherein the second liquid comprises a diafiltrate solution and wherein the flow rate of said diafiltration solution is controlled according to the following equation:

$$a(c_i)=1-\{\Sigma_i\sigma_i[\partial g/\partial \ln c_i]\}/\{\Sigma_i[\partial g/\partial \ln c_i]\}$$

wherein:
 a=a dimensionless constant representing the diafiltration solution to permeate flow rate ratio
 $c_i$=concentration of component i in the system
 $\sigma_i$=a dimensionless constant denoting the passage of component i.

17. The process of claim 16 including the step of conducting either a pure concentration or pure dilution mode of operation prior to operating according to the equation of claim 15.

18. The process of claim 16 including the step of conducting either a pure concentration or pure dilution mode of operation after operating according to the equation of claim 15.

19. The process of claim 16 including the steps of conducting either a pure concentration or pure dilution mode of operation both prior to and after operating according to the equation of claim 15.

20. The process of claim 12 wherein the control of the flow rate of said second liquid maintains component concentrations in said reservoir within 20% of the concentration given by a predetermined relationship between concentrations of the components, solvent flux and passage of a selected component.

* * * * *